United States Patent [19]
Nitzki

[11] 3,978,807
[45] Sept. 7, 1976

[54] OFFSHORE STATION AND METHOD OF MAINTAINING THE SAME

[75] Inventor: Leopold Nitzki, Bremen, Germany

[73] Assignee: Aktiengesellschaft "Weser", Bremen, Germany

[22] Filed: Jan. 14, 1975

[21] Appl. No.: 540,946

[30] Foreign Application Priority Data
Mar. 16, 1974 Germany............................ 2412687

[52] U.S. Cl. .......................... 114/.5 D; 114/43.5 R; 114/123
[51] Int. Cl.² ......................................... B63B 35/44
[58] Field of Search ................ 114/.5 D, 43.5 R, 61, 114/77 R, 121, 45, 123, 125, 66.5 F; 61/46.5

[56] References Cited
UNITED STATES PATENTS

| | | | |
|---|---|---|---|
| 1,412,852 | 4/1922 | Engstrand | 114/45 |
| 2,938,354 | 5/1960 | Knapp | 114/123 |
| 2,972,973 | 2/1961 | Thearle | 114/43.5 |
| 3,605,413 | 9/1971 | Morgan | 114/.5 D |
| 3,797,438 | 3/1974 | Fayren | 114/.5 D |

*Primary Examiner*—Trygve M. Blix
*Assistant Examiner*—Stuart M. Goldstein
*Attorney, Agent, or Firm*—Michael J. Striker

[57] ABSTRACT

An offshore station moored at sea is comprised of a plurality of floats which support a platform that is adapted to accommodate personnel, facilities, and equipment. The platform-supporting floats have normally submerged portions which require periodic maintenance due to their continuous subjection to corrosion and marine fouling by sea water. Ballasting chambers are provided so that the floating level of each float may be raised or lowered by either blowing or flooding the float, respectively. Freshly-maintained floats are thereby interchanged with the platform-supporting floats.

11 Claims, 6 Drawing Figures

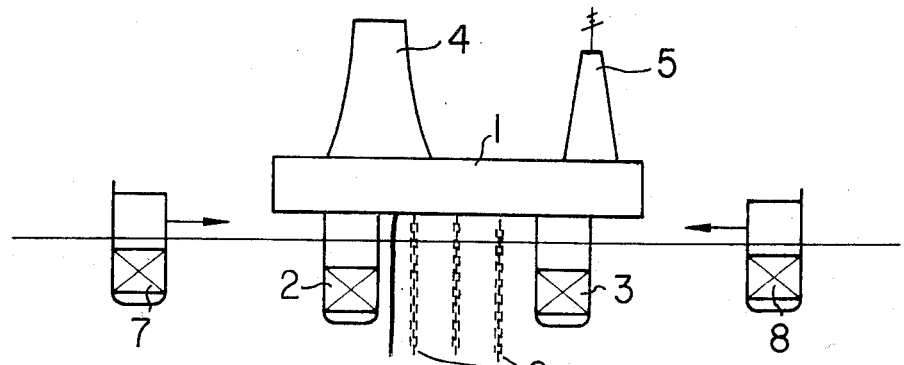
FIG. 1
FIG. 3
FIG. 2
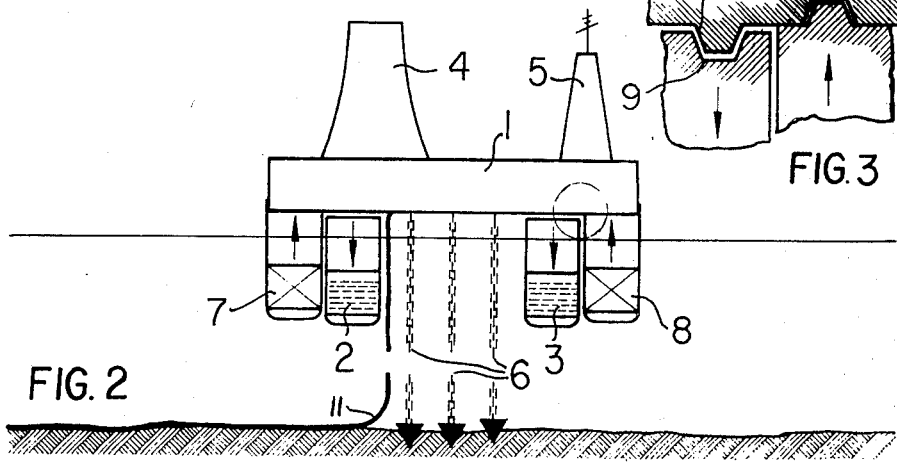
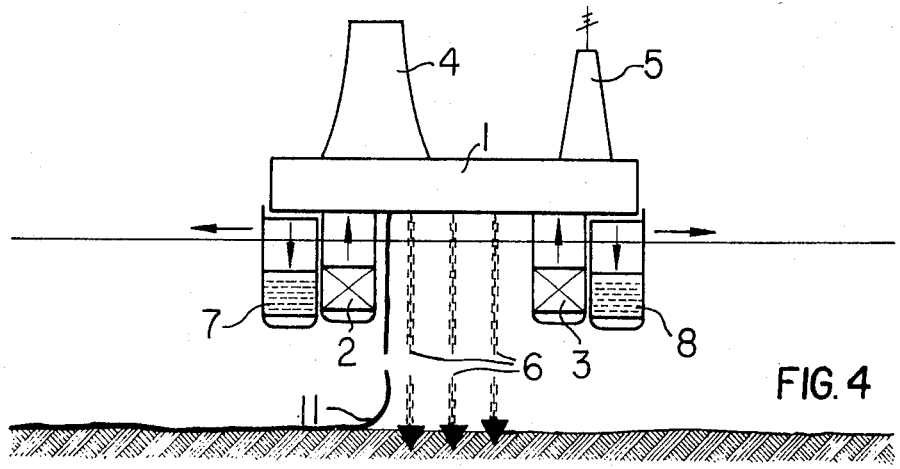
FIG. 4

OFFSHORE STATION AND METHOD OF MAINTAINING THE SAME

BACKGROUND OF THE INVENTION

The present invention relates to offshore stations, and more particularly to offshore stations moored at sea which are supported by floats.

In the prior art, it is known to have fixed or mobile stations, such as oil drilling rigs or scientific research stations located offshore because the item to be mined or studied is located offshore. Additionally, under present discussion, it is desired to locate power plants, and especially nuclear power plants, remote from shore, because of environmental and safety reasons.

In the case of nuclear power plants for the generation of electricity, an offshore station would have the capability of dumping the nuclear reactor's radioactive waste in the sea at various locations, thereby minimizing the buildup of radioactivity in one particular location.

All of the aforementioned offshore stations share the common problem that they have a submerged support structure which requires periodic maintenance. The sea environment attacks the support structure by mechanical erosion due to wave motion, chemical corrosion due to the presence of salt and other minerals found in sea water, and marine fouling due to the ever present growth of sea life, such as algae and seaweeds.

The prior art has attempted to deal with the maintenance problem by the technique of periodically ferrying the entire station to a home base on land for a complete overhaul. This approach has the obvious disadvantage of disturbing the work being performed by the station, as well as the further engineering problem of being very difficult to tow offshore stations of great physical size. It will be appreciated that in the case of a nuclear power plant which supplies electricity to a city, that it would be intolerable to stop the work of the station, as well as being virtually impossible to tow a station of such a great size.

The prior art has further dealt with the maintenance problem by periodically applying a layer comprised of chemical substances which are resistant to the corrosive effects of sea water. However, this approach suffers from the disadvantage that the chemical coats are only of limited stability; consequently, this approach results in relatively short time intervals between maintenance periods. Furthermore this approach does not deal at all with the marine fouling problem which is caused by the growth of sea life and which must be periodically scraped off.

The prior art also has utilized "sacrificial cathode" techniques. Different metals on the support structure having differing electrochemical conductive potentials will conduct an electrical current through the sea water due to the presence of salt and other minerals commonly found in the sea. In other words, an electrolysis reaction will take place with the different metals serving as the cathode and anode respectively, and the sea water acting as the electrolytic solution. A sacrifical cathode of higher electrical conductivity than one of the metals on the support structure is placed in closer proximity to the other metal, so that the electrolytic reaction will occur not between the metals of the support structure, but between the sacrificial cathode metal and only one metal of the support structure. This approach suffers from the disadvantage that the sacrificial cathode eventually wastes away and must be replaced at very frequent intervals. Moreover, divers are needed to constantly replace the costly sacrificial cathode. In the case of power plants which create force fields and thermal gradients and other electrical effects, a practical and efficient application of sacrificial cathodes is very difficult, and indeed not even possible.

Another problem in the prior art is the technique to be utilized in supplying additional personnel, food supplies and equipment to the offshore station. Helicopters which are generally utilized for this function are extremely costly to operate, as well as having a limited cargo capacity.

SUMMARY OF THE INVENTION

Accordingly, it is the general object of the present invention to overcome the disadvantages of the prior art.

More particularly it is an object of the present invention to provide an improved offshore station which can be maintained easily for long periods of time from the effects of corrosion and fouling by sea water without disturbing the work being performed on the station.

Another object of the present invention is that the platform need not be towed ashore for maintenance.

An additional object of the present invention is to supply personnel, food supplies, and equipment in a practical manner without utilizing helicopters.

In keeping with these objects, and others which will become apparent hereafter, one feature of the present invention is that the offshore station is comprised of a plurality of floats which support a platform that is adapted to accommodate personnel, facilities, and equipment. The floats which have normally submerged portions that are subjected to corrosion and fouling by sea water are each provided with ballasting means. By blowing air in an individual float, the float will rise above its normal floating level. By flooding water in an individual float, the float will sink to a position below its normal floating level. This capability of altering the floating level of each float is utilized to interchange freshly-maintained floats with floats that are supporting the platform and which require maintenance.

At least two floats are employed to support the platform in a stable position in the sea. When maintenance is required, two freshly-maintained floats are ferried into position laterally of the platform and adjacent the floats which require maintenance. By flooding the ballast tanks of the fresh floats, they are submerged to a position in which they can be moved beneath the platform in readiness to engage the underside of the platform. By subsequently blowing the ballast tanks of the fresh floats, the latter rise to engage the underside of the platform so as to support the platform in at least two locations spaced from but adjacent to the platform-supporting locations of the maintenance-requiring floats. In a similar reciprocal manner, by flooding the maintenance-requiring floats, these floats will be disengaged from the platform and may be ferried away from the platform. These floats may now be brought onto the platform itself for maintenance, or they may be brought ashore. Evidently, the maintenance-requiring floats could also be replaced one at a time, instead of both at the same time.

It is clear that by this feature of interchangeable floats, the offshore station can be maintained easily without disturbing the work being performed on the station and without requiring the platform to be towed ashore.

Additionally, since the underside surface portions of the platform which were engaged by the first-mentioned floats which required maintenance, are now exposed, these underside surface portions may now undergo local maintenance as well.

Another feature of the present invention is that the floats may be barge-shaped or pontoon-shaped. In other words, the floats may be shaped as navigable vessels. In this way, the floats themselves may be utilized to carry replacement personnel, food supplies, and miscellaneous equipment to the station. The prior art supply problem of utilizing helicopters having limited storage capacity is thereby overcome in a simple and efficient manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic side view of an offshore station according to the present invention depicting one phase of the maintenance operation;

FIG. 2 is a diagrammatic side view of an offshore station depicting another phase of the maintenance operation;

FIG. 3 is an enlarged view of a detail of FIG. 2;

FIG. 4 is a diagrammatic side view of an offshore station according to the present invention depicting still another phase of the maintenance operation;

DESCRIPTION OF THE PREFERRED EMBODIMENTS

Figure 5:
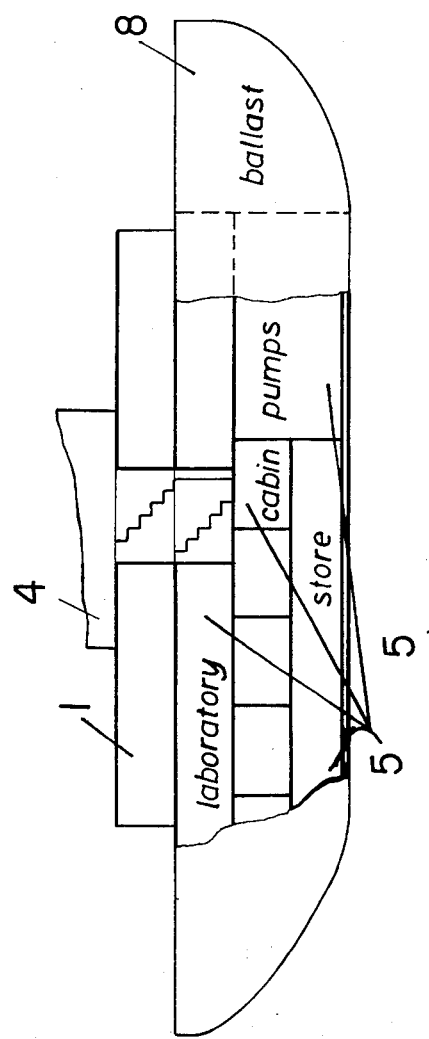
FIG. 5 is a broken-away side view of a float according to the present invention.

Discussing the apparatus which has been illustrated in an exemplary embodiment in FIGS. 1 through 6, it will be seen that reference numeral 1 identifies a platform which is adapted to accommodate personnel, personnel facilities, and equipment. In the exemplary case where the offshore station is to be a power station, such as a nuclear power plant, then the platform may be provided with a reactor 4 and facilities 5. It will be understood that other equipment and devices may be provided on the platform, and of course, such equipment will vary with the intended use of the offshore station.

The platform 1 is rectangularly-shaped and is supported at its underside portion by at least two partially submerged floats 2, 3 spaced so as to keep the position of the platform 1 stable and out of the sea, although the platform 1 itself may also have buoyancy.

Anchor chains 6 are employed to anchor the position of the offshore station to the seabed in a standard manner, for example by anchor stakes.

Conduit means 11 are further provided to provide the offshore station with electrical power, or telephone service, or fresh water. Of course, the conduit means 11 may also serve to export electrical power, or oil, or any item produced by the offshore station to shore.

Freshly maintained floats 7, 8 as well as platform-supporting floats 2, 3 are provided with ballasting means. At least one chamber is provided within each float so as to accommodate the blown-in air or the flooded-in water. By blowing air, the float will rise above its normal floating level; and by flooding-in water, the float will sink below its normal floating level. These operations are substantially akin to the negative-positive buoyancy cycle employed in submarines to alter their position in the sea.

Connecting means 9, 10 are provided on the underside of the platform 1 and on the top surface of the floats so as to support the platform 1 in a stable manner. In one exemplary embodiment, recesses 9 and projections 10 are employed to cooperate with each other. The recesses 9 and projections 10 of the platform extend longitudinally along the entire underside of the platform, so that they may seat within corresponding extending recesses and projections on the top surface of the floats. The connecting means are shown in FIG. 3 to be of generally flattened V-shaped configuration, so as to prevent lateral movement of the floats relative to the platform.

In order to assure a secure and fixed connection of the floats to the platform, bolts may be further provided to lock the floats into their platform-supporting position.

The interchange of floats 2 and 3 with fresh floats 7 and 8 proceeds substantially as follows:

Freshly-maintained floats 7, 8 are ferried in towards opposite ends of the platform 1 as shown in FIG. 1 in the direction of the arrows. That is, float 7 is ferried to the right and float 8 is ferried towards the left, so that each may be laterally introduced under the underside of the platform 1 and engage the edge of the platform. The upwardly-extending portions on the floats 7, 8 limit the extent to which the floats 7, 8 are introduced under the platform by engaging the platform 1 at its edge portions. Of course, floats 7, 8 may be longitudinally inserted under the platform as well, in which case, the upwardly-extending portions on the floats 7, 8 engage the platform 1 at its edge portions and guide the floats 7, 8 into the appropriate recess or projection of the connecting means.

In order to accomplish the lateral or longitudinal insertion of the floats 7, 8, the floats 7, 8 must be ballasted so that the irrespective floating level is lowered in the sea water. In other words, the floats 7, 8 must approach the underside of the platform 1 from below so that each float may seat within the corresponding projection or recess on the underside of the platform 1.

After the floats 7, 8 have been placed in the proper orientation, air must be blown in to raise the floats 7, 8 to support the platform. At substantially the same time, or slightly thereafter, the floats 2, 3 which require maintenance should be flooded so that their relative floating position is below their normal floating position. In this way, the floats 2, 3 are disengaged from the platform 1 and may be ferried out longitudinally away from the platform. FIG. 2 shows this phase of the operation diagrammatically by means of arrows. The upwardly directed arrows of the floats 7, 8 indicate the blowing operation; whereas the downwardly directed arrows of the floats 2, 3 indicate the flooding operation. The floats 2, 3 may now be brought ashore for maintenance or may be brought aboard the platform itself.

In a similar manner, FIG. 4 diagrammatically shows, the inverse operation for the next scheduled time for maintenance. This time, floats 7, 8 are the floats requiring maintenance, and floats 2, 3 are the floats which have been freshly maintained. In like procedure, floats 2, 3 are ferried in, and ballasted so as to be longitudinally inserted under the platform. The floats 7, 8 are then flooded so as to be detached from the platform and ferried away—either laterally or longitudinally—from the platform for maintenance.

FIG. 3 shows in an enlarged detail the connecting means. The underside of the platform 1 in the region of floats 3, 8 comprises a projection 10 and recess 9. Each individual float has a cooperating recess or projection so that the floats may be thereby engaged on the underside of the platform. As noted above, the connecting means extend longitudinally along the entire underside portion of the platform so as to define channel-like projections and recesses.

FIG. 5 shows the partial interior of a float. The float is shaped in a standard ship- or pontoon-like construction. A laboratory, cabin, pumps, ballasting means, stores, and the like are shown to emphasize the fact that the floats themselves serve not only to maintain the station from the effects of sea water, but to supply the station with additional personnel, equipment, and the like. Stairs are also illustrated to indicate the means by which the personnel and equipment are transported topside to the platform 1. Evidently, a (not illustrated) propulsion source will be provided if the floats are to travel under their own power.

Figure 6:
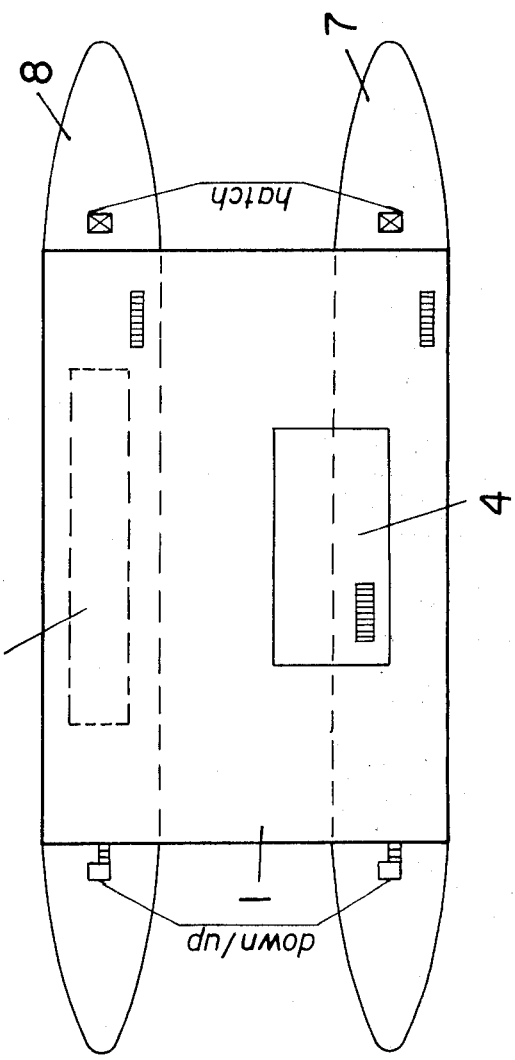
FIG. 6 is a diagrammatic top view of FIG. 5 showing two platform-supporting floats according to the present invention.

FIG. 6 is a top view of FIG. 5 showing two floats side-by-side, and extending beyond the edges of the platform 1 in order to stabilize the latter. Of course, it will be understood that more than two floats may also be employed. Hatches are also illustrated to indicate the openings through which personnel and equipment are transported topside.

In the described offshore station, it will be appreciated that the present invention is not limited to power stations or nuclear power stations. It may be a scientific research station, for example a meteorological station, an oceanographic station, or any scientific measurement station for measuring natural phenomena such as earthquakes. Other possibilities for offshore stations, of course, include hospital stations, sanitariums, leper colonies, prison farms, hotels and the like.

It will be understood that each of the elements described above, or two or more together, may also find a useful application in other types of constructions differing from the types described above.

While the invention has been illustrated and described as embodied in an offshore station and method of maintaining the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An offshore station moored at sea, comprising a platform; a plurality of first floats supporting said platform from below at a first platform-supporting position, said first floats being subject to corrosion and marine fouling so that they require periodic maintenance of at least their normally submerged portions; a plurality of second floats underneath said platform and adapted to support the same from below at a second platform-supporting position adjacent said first position, said second floats being free of corrosion and marine fouling; and means for interchanging said first floats with said second floats, said interchanging means including ballasting means in said first and second floats for changing the respective floating levels of the latter, whereby all of said first floats requiring maintenance are removed from their first platform-supporting position and exchanged with said second freshly maintained floats so that the latter now support said platform at said second position.

2. An offshore station as defined in claim 1, wherein said platform is adapted to accommodate personnel, facilities and research equipment.

3. An offshore station as defined in claim 1; and further comprising anchoring means to anchor said platform to the sea bed.

4. An offshore station as defined in claim 1; and further comprising conduit means connected to said platform and providing said platform with electrical power, telephone service, and fresh water.

5. An offshore station as defined in claim 1, wherein said platform has an underside portion; and further comprising connecting means for connecting said floats to said underside portion of said platform so as to support the latter substantially out of contact with the sea water.

6. An offshore station as defined in claim 5, wherein said connecting means includes first connecting means provided on said underside portion, and second connecting means provided on said floats which cooperates with said first connecting means, so as to stabilize the position of said floats relative to said platform.

7. An offshore station as defined in claim 6, wherein said first connecting means comprises a plurality of recesses and projections, and wherein said second connecting means comprises respectively cooperating projections and recesses.

8. An offshore station as defined in claim 7, wherein said projections and recesses extend longitudinally along said underside portion of said platform so as to form channel-like cooperating elements.

9. An offshore station as defined in claim 1, wherein each of said floats is of ship-like construction and is adapted to transport personnel, supplies, and equipment to and away from said platform.

10. An offshore station as defined in claim 1, wherein said ballasting means is operative to impart positive and negative buoyancy to said floats by respectively blowing air and flooding water into said floats.

11. A method of maintaining an offshore station moored at sea comprising the steps of supporting a platform from below with first floats at a first platform-supporting position, said first floats being subject to corrosion and marine fouling so that they require periodic maintenance of at least their normally submerged portions; providing second floats underneath said platform at a second platform-supporting position adjacent said first position, said second floats being free of corrosion and marine fouling; and interchanging said first floats with said second floats by ballasting said first and second floats and thereby changing their respective floating levels, whereby said first floats are removed from their first position and exchanged with said second floats so that the latter now support said platform at said second position.

* * * * *